United States Patent [19]

Barker

[11] Patent Number: 5,202,558

[45] Date of Patent: Apr. 13, 1993

[54] FLEXIBLE FIBER OPTIC PROBE FOR HIGH-PRESSURE SHOCK EXPERIMENTS

[76] Inventor: Lynn M. Barker, 13229 Circulo Largo NE., Albuquerque, N. Mex. 87112

[21] Appl. No.: 846,526

[22] Filed: Mar. 4, 1992

[51] Int. Cl.$^5$ .............................................. H01J 5/16
[52] U.S. Cl. ............................ 250/227.21; 356/28.5
[58] Field of Search ............... 250/221, 227.21, 227.27, 250/556, 561; 356/27, 28, 28.5

[56] References Cited

U.S. PATENT DOCUMENTS

| | | | |
|---|---|---|---|
| 3,820,896 | 6/1974 | Stavis | 356/28.5 |
| 3,899,251 | 8/1975 | Frenk et al. | 356/28.5 |
| 4,154,529 | 5/1979 | Dyott | 356/28.5 |
| 4,746,211 | 5/1988 | Ruth et al. | 356/28.5 |
| 4,915,499 | 4/1990 | Gidon et al. | 356/28.5 |
| 4,928,152 | 5/1990 | Gerardin | 356/28.5 |
| 5,013,928 | 5/1991 | Ikeda et al. | 356/28.5 |
| 5,131,741 | 7/1992 | Zweben | 356/28.5 |

OTHER PUBLICATIONS

M. Durand, "The Use of Optical Fibers for Velocity Measurement by Doppler-Laser Interferometry with Fabry-Perot Interferometer," (English translation of title), in Journées de Détonique 84–Tome 1 (1984).

S. Gidon, G. Garcin, and H. Behar, "Doppler Laser Interferometry with Light Transmission by Two Optical Fibers," from Proceedings of the 16th International Conference on High Speed Photography and Photonics, Strasbourg, France, Aug. 27-30, 1984.

*Primary Examiner*—David C. Nelms
*Assistant Examiner*—S. Allen

[57] ABSTRACT

A fiber optic probe for supplying and collecting instrumentation light in shock experiments. The fiber optic probe comprises two optical fibers and the necessary lens elements to concentrate laser light coming from one of the fibers onto a specimen, and to collect reflected laser light from the specimen into the second fiber. The fibers and lens elements are mounted in a special frame which facilitates better alignment of the lens/fiber arrangement by precise control of the flexing of the fiber optic probe's frame. Improved reflected light gathering efficiency and improved depth of field are achieved by the choices of the optical fiber diameters and by using good optical design practice. Inexpensive components and fabrication techniques allow for the economical use of these probes even when one is destroyed with each experiment.

14 Claims, 2 Drawing Sheets

FLEXIBLE FIBER OPTIC PROBE FOR HIGH-PRESSURE SHOCK EXPERIMENTS

BACKGROUND OF THE INVENTION

1. Field of the Invention

The present invention relates to an optical instrumentation device for use in experiments involving high-pressure shock waves generated by impacts or explosives. More specifically, the present invention relates to a fiber optic probe for focusing laser light onto a specimen and for collecting reflected laser light from the specimen for the purpose of determining the specimen's surface velocity history during high-pressure shock wave experiments.

2. The Description of Related Art

Shock experiments involving projectile impacts or explosive detonations have been used for several decades to determine material properties under dynamic conditions and at extremely high pressures. A review of this field can be found in the paper by L. C. Chhabildas and R. A. Graham, "Developments in Measurement Techniques for Shock-Loaded Solids," in Techniques and Theory of Stress Measurements for Shock Wave Applications, Edited by R. B. Stout, F. R. Norwood, and M. E. Fourney, American Society of Mechanical Engineers, AMD - Vol. 83, pp 1–18 (1988). One of the most valuable instrumentation techniques in shock experiments has been laser velocity interferometry, in which laser light is focused onto the specimen's diffusely reflecting surface. Some of the reflected light is collected, and, as the surface moves during a shock experiment, the doppler shift of the reflected light is measured in an interferometer. The continuous measurement of the doppler shift results in a continuous velocity history of the surface of the shocked specimen, from which, together with other information, the specimen material properties are calculated, as described in the above-mentioned paper by Chhabildas and Graham.

In traditional experiments, the light from the laser, located remote from the impact site, is directed by mirrors to the impact chamber, where it is focused by a lens at a point on the specimen surface. The same lens collects some of the reflected light, collimating it for the return trip to the interferometer, usually located close to the laser. One difficulty with this approach is that intense laser beams are directed through work areas, creating problems for eye safety. To address this concern, work areas should be restricted during shot set-up, resulting in loss of worker efficiency. Another difficulty concerns the complexity of the optical alignment when a number of mirrors are used to direct the laser beams to and from the specimen in the impact chamber.

Attempts have been made to address these difficulties by using optical fibers to transport the laser light to the specimen and from the specimen back to the interferometer. The use of optical fibers requires lens elements close to the specimen to focus the light from a fiber onto the specimen surface and to collect reflected light into a fiber leading to the interferometer. The assembly comprising the fiber ends and the lenses held in the correct positions with respect to each other has been called a fiber optic probe. Because a fiber optic probe is normally located close to the specimen surface, in most experiments it is impacted and destroyed by the specimen just after it serves its function.

One of the first uses of fiber optic probes for shock wave instrumentation was described by Durand of France in a paper entitled "The Use of Optical Fibers for Velocity Measurement by Doppler-Laser Interferometry with Fabry-Perot Interferometer," published in the French journal Journees de Detonique in 1984. Durand's version of the fiber optic probe made use of a single fiber to carry the laser light both to and away from the shocked specimen. Using a single fiber has two disadvantages: First, about 4% of the light from the laser is reflected back into the fiber by the glass surface of the fiber's end. This can easily be more light than is collected into the fiber from the diffusely reflecting specimen surface. However, the internally reflected light from the fiber's end contains no doppler shift information, and thus it is detrimental to the velocity measurement. Second, the fiber supplying light to the specimen is the same size as the fiber collecting the reflected light, since they are one and the same fiber. However, it is an advantage to have a small diameter fiber to deliver light to the specimen so it can be focused to a small point, but a much larger fiber for collecting the reflected light to enhance its light-gathering aperture. Thus, Durand's fiber optic probe had shortcomings both in purity of the signal light returned to the interferometer and in light collection efficiency.

Another fiber optic probe design was described by S. Gidon, G. Garcin, and H. Behar, also of France, in their paper "Doppler Laser Interferometry with Light Transmission by Two Optical Fibers," which appears in the Proceedings of the 16th International Conference on High Speed Photography and Photonics, held in Strasbourg, France, Aug. 27–30, 1984. Although Gidon, et. al. solved the fiber end reflection problem by using a second fiber for the return light, both fibers were the same size, and no adjustment provisions were made to position the return fiber's end at the point of focus of the reflected light. Thus, the reflected light collection efficiency was very poor in their design.

Within the last four years, I personally designed two versions of the fiber optic probe while I was still employed at Sandia National Laboratories. Neither of these designs has been described in the literature. In the first design, a 2 mm diameter graded index (GRIN) rod lens was used to focus the light from a fiber with a 50 $\mu$m core diameter onto the specimen surface, and a second 2 mm diameter GRIN lens, adjacent to the first, was used to collect reflected light into a second fiber with a 200 $\mu$m core leading to the interferometer. The use of two fibers solved the internal reflection problem of single-fiber probes, but the probes were quite inefficient at gathering reflected light, their depth of field (distance the specimen surface could move before appreciable loss of light occurred) was quite small, their alignment mechanism was difficult to use, and they were expensive to make.

In my second design, a 2 mm hole was drilled through the center of a 10 mm diameter, 10 mm focal length glass lens, and a GRIN rod lens was cemented in the hole to capture the light from a 50 $\mu$m fiber and focus it onto the specimen surface about 20 mm away. The 10 mm diameter lens then captured reflected light and concentrated it onto the end of a 300 $\mu$m fiber leading to the interferometer. Although this design gathered more reflected light than my first design, the amount of light returned to the interferometer was still marginal, the depth of field was small, the alignment of the optics of the probe was difficult, and the probe was expensive to fabricate.

OBJECTS OF THE INVENTION

Accordingly, several objects and advantages of my invention are:

1. The design of the probe allows its optical elements to be more easily and accurately aligned with respect to each other than previous designs.
2. The probe is much more efficient at gathering reflected light than previous designs.
3. The probe has a greater depth of field than previous designs.
4. While achieving the above advantages, the probe uses less expensive components and is less expensive to fabricate than previous designs.

SUMMARY OF THE INVENTION

These and other objects and advantages are achieved in the fiber optic probe of this invention. The preferred embodiment of the probe comprises a frame in which three optical lenses are situated, as well as the ends of two optical fibers. The first optical fiber, called the specimen-illuminating fiber, provides laser light from a remote laser. The light emanating from the fiber end is captured by a graded index (GRIN) rod lens and concentrated at a small spot on the specimen surface. The specimen surface is usually made to be diffusely reflecting in order to prevent possible drastic changes in reflectivity as a result of the arrival of a strong shock wave. Some of the diffusely reflected laser light from the specimen surface is collected by two additional lenses and concentrated at the end of the second optical fiber, called the reflected-light fiber, which conducts the light to an interferometer some distance away.

Each of the two fiber ends must be precisely aligned with respect to the lens elements in the probe. The alignment of the specimen-illuminating fiber with respect to the GRIN lens is facilitated by four set screws which control the position of the GRIN lens. The alignment of the reflected-light fiber end to the point of best concentration of the reflected light is facilitated by three screws. One is a set screw which clamps the fiber at the proper longitudinal position. Two additional flexure adjusting screws control the flexing of the probe's frame in two orthogonal directions, thus positioning the reflected-light fiber end in the two transverse directions.

The probe's light gathering efficiency results first from the use of a much larger fiber diameter for the reflected-light fiber than for the specimen-illuminating fiber. The preferred embodiment uses a 50 $\mu$m specimen-illuminating fiber and a 1000 $\mu$m reflected-light fiber, for a diameter ratio of 20:1. Second, the light gathering efficiency is enhanced by the incorporation of good optical practice to minimize spherical lens distortions.

The probe's greater depth of field results from the same two features as the enhanced light gathering efficiency, namely, the use of a much larger reflected-light fiber diameter, and the use of better optical practice in collecting reflected light into the reflected-light fiber. In addition to these features, in the preferred embodiment, the arrangement of the optics causes the point of reflected light concentration to move only about 60% as far as the specimen surface moves, assuming small displacements. Thus, the defocusing due to reflecting surface motion is reduced, and a larger depth of field results.

Economy of probe fabrication is achieved by the use of inexpensive components which are easily machined, by the choice of materials and designs which minimize the machining required in fabrication, and by the use of a design which facilitates easy alignment of the probe's optical components.

The features and advantages of the present invention will become more apparent from the following detailed description of the invention when read with the accompanying drawings.

REFERENCE NUMERALS IN DRAWINGS

Figure 1A:
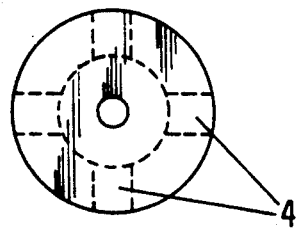
FIG. 1 shows three orthogonal views of the frame of the fiber optic probe.

1. Frame of the fiber Optic probe
2. Slits
3. Web of material between slits
4. Hinge stations
5. Flex-adjusting screws
6. Access holes
7. Brass ferrules
8. Specimen-illuminating optical fiber
9. Reflected-light optical fiber
10. First plastic lens
11. Second plastic lens
12. GRIN rod lens
13. Hole through center of second plastic lens
14. End of core/clad glass of specimen-illuminating fiber
15. Hole through center of first plastic lens
16. Specimen surface
17. Seat for second plastic lens
18. Large longitudinal hole in frame
19. Set screws securing first plastic lens in place
20. Light concentrated on specimen surface
21. Reflected light cone falling on first plastic lens
22. Set screw holding reflected-light fiber in place
23. Reflected-light fiber end viewing hole

DETAILED DESCRIPTION

Figure 1B:
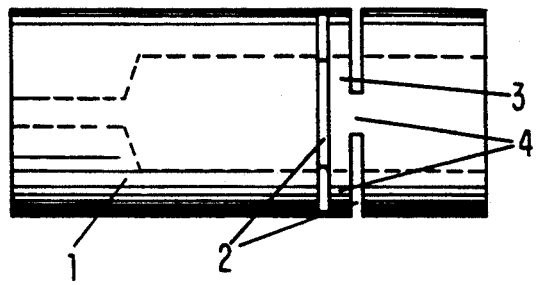
Figure 1C:
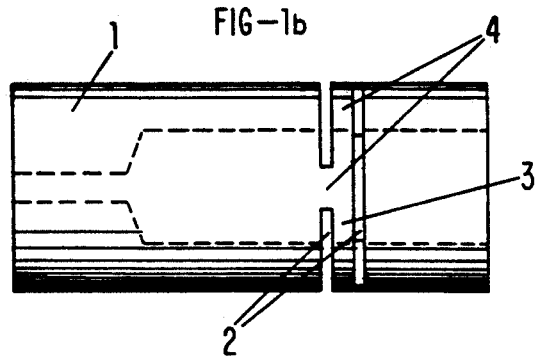
Figure 2:
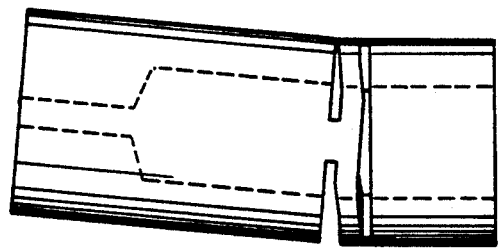
FIG. 2 is an illustration of a flexed frame.

Three orthogonal views of the frame of the fiber optic probe are shown in FIG. 1, where some details are omitted for simplicity. The frame 1 is 15.9 mm in diameter and 38 mm long in the present embodiment; the drawing is approximately to scale. The frame should be made of a suitably flexible material which does not break easily. A polycarbonate plastic has been found to be a satisfactory material. The slits 2 in the sides of the frame introduce the desired flexibility. The slits are 0.75 mm wide, and the web 3 of material between the slits is 1.75 mm thick. Each pair of opposing slits leaves two hinge stations 4 of intact material connecting the frame parts on either side of the slits. The hinge stations are 3.2 mm wide. A flexed frame is shown in FIG. 2.

Figure 3A:
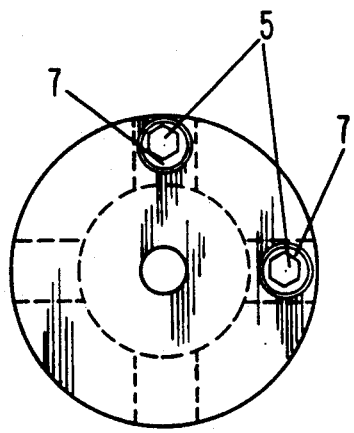
FIG. 3 shows the details of the flex-adjusting screws in the frame.
Figure 3B:
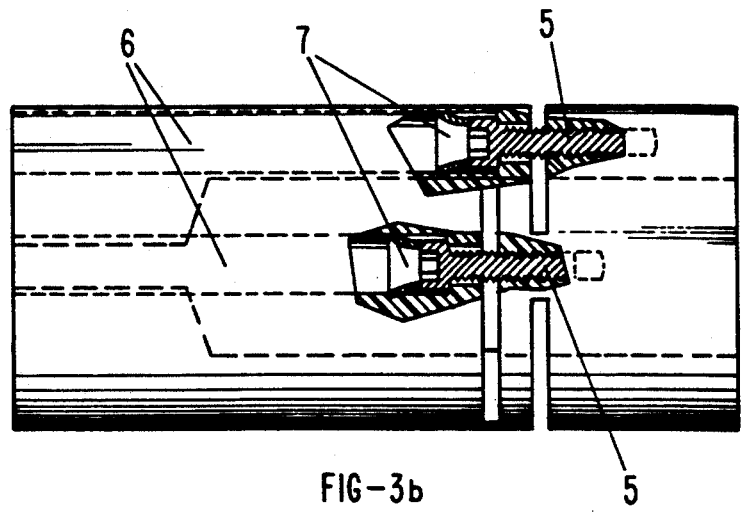

FIG. 3 shows the flex-adjusting screws 5 in the frame. The screws are steel 0-80 socket heads, and are adjusted using an Allen wrench through access holes 6. The screws are self-tapping in the polycarbonate frame, which simplifies fabrication. After the screws are seated during assembly of the frame, slightly oversize brass ferrules 7 are hammered into the access holes 6 until they touch the tops of the screws 5. The ferrules 7 serve in part to guide the Allen wrench into the heads of the screws 5. Advancing the top screw of FIG. 3 pulls the top slit closed, producing the flex illustrated in FIG. 2. Unscrewing the top screw causes the screw head to push against the ferrule 7, pushing the top slit open and producing a flex opposite to that of FIG. 2. The side screw controls flexing in the orthogonal direction. The precisely controlled flexing in two orthogonal directions facilitates easy alignment of the reflected-light fiber of the fiber optic probe, as will be explained below.

Figure 4:
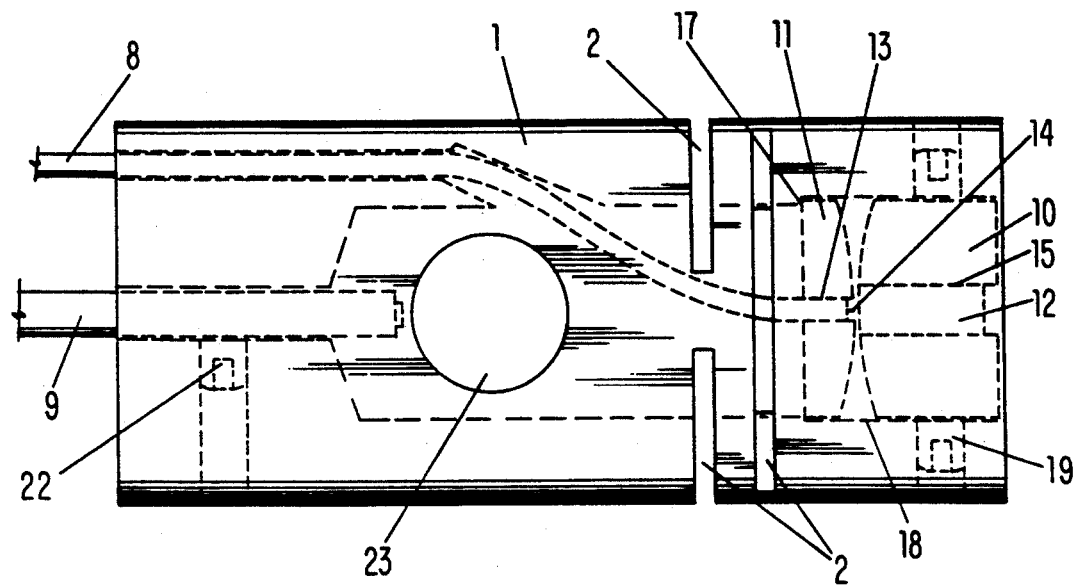
FIG. 4 shows the arrangement of the optical fibers and the lenses in the frame.

FIG. 4 shows the fiber optic probe, including the frame 1, the 50 $\mu$m specimen-illuminating optical fiber 8, the 1000 $\mu$m reflected-light optical fiber 9, the first plastic lens 10 with 35 mm focal length and 8.94 mm diameter, the second plastic lens 11 with 17 mm focal length and 9.02 mm diameter, and the graded index (GRIN) rod lens 12 with quarter-pitch and 2.00 mm diameter. For simplicity, the flex-adjusting screws 5 of FIG. 3 are not shown in FIG. 4. The diameter shown of the specimen-illuminating fiber 8 is the diameter of its plastic buffer, 0.91 mm, around the fiber's core and clad. The end of the specimen-illuminating fiber is anchored in the 0.93 mm hole 13 through the center of the second plastic lens 11 The end 14 of the core/glad glass of the specimen-illuminating fiber 8 is shown protruding from the end of the buffer.

The first plastic lens 10 has a 2.00 mm hole 15 through its center, in which the GRIN lens 12 is anchored either by cement or by a press fit. Because a fiber optic probe is normally destroyed in each shock experiment, it is important to keep the probe cost reasonable. Therefore, optical quality plastic lenses 10 and 11 are used. Plastic lenses are much less expensive than glass lenses, and the drilling of central holes and the machining of outside diameters is much less expensive in plastic lenses than in glass lenses.

Figure 5:
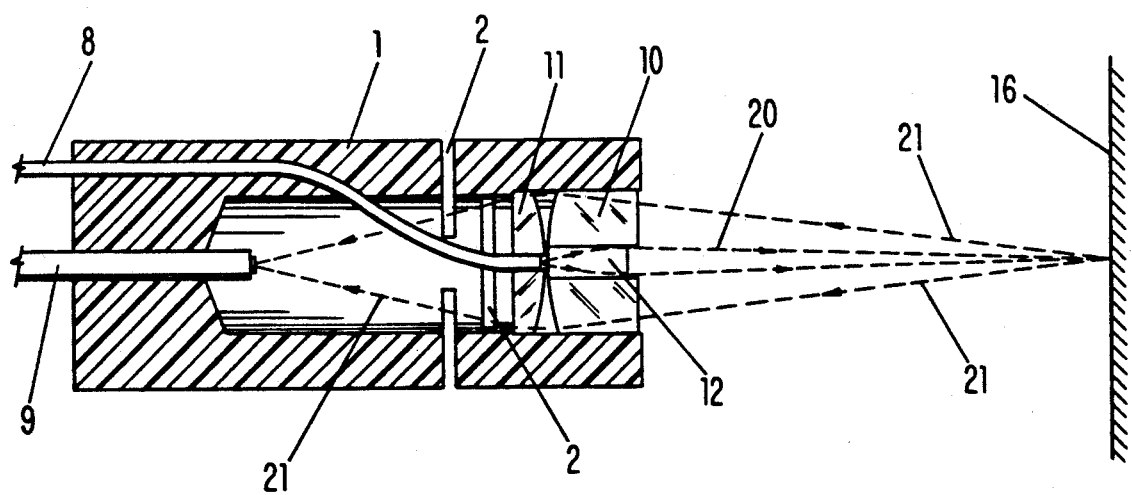
FIG. 5 shows the light paths in the fiber optic probe, and between the fiber optic probe and the specimen.

The light from the specimen-illuminating fiber 8 is captured by the GRIN rod lens 12, which focuses the light onto the specimen surface 16 (See FIG. 5). In order to properly focus the light, the distance between the fiber end 14 (FIG. 4) and the GRIN rod lens 12 must be adjusted during manufacture and then held fixed. To this end, the second plastic lens 11, in which the fiber end 14 has been fixed, is cemented in place on its seat 17 where the large longitudinal hole 18 in the frame decreases in diameter from 9.13 mm to 8.73 mm. Then the first plastic lens 10 position is adjusted longitudinally until the GRIN lens 12, which is fixed in lens 10, properly focuses the light from the illuminating fiber end 14 at a distance of 30 mm (See FIG. 5). The lens 10 is then secured in place by four set screws 19 (FIG. 4) at 90° intervals around the lens 10. The 1-72 steel set screws 19 are self-tapping in the polycarbonate plastic of the frame.

In order for the focused light beam from the GRIN lens 12 to be collinear with the axis of the fiber optic probe, the fiber end 14 must be centered with respect to the GRIN lens 12. In addition to fixing the longitudinal position of the lenses 10 and 12, the set screws 19 also provide the centering alignment of the GRIN lens 12 with respect to the fiber end 14. This is possible because the lens 10 is made approximately 0.19 mm smaller in diameter than its hole 18 in the frame. Therefore, selective tightening and loosening of the set screws 19 provides the required centering.

FIG. 5 is intended mainly to show the light paths with respect to the optical fibers and the lenses of the probe. Therefore, for simplicity, certain details shown in the other figures are omitted in FIG. 5. Some of the light 20 concentrated on the specimen surface by the GRIN lens 12 is reflected back toward the fiber optic probe. The reflected light contains the surface velocity information by virtue of the Doppler shift in the light frequency. The portion of the reflected light 21 which falls on the surface of lens 10 is concentrated by lenses 10 and 11. During manufacture of the probe, the end of the reflected-light fiber 9 is positioned at the point of best reflected light concentration, such that it gathers in the reflected light and guides it to an interferometer for decoding of the Doppler shift. The end of the reflected-light optical fiber 9 is positioned longitudinally at the distance of best concentration and held there by a set screw 22 (FIG. 4).

The lateral positioning of the fiber end at the point of best concentration, or vice versa, is then accomplished by the use of the flex-adjusting screws 5 of FIG. 3. Whether the fiber end is moved to the point of best light concentration, or whether the point of best concentration is moved to the fiber end by the flex-adjusting screws is determined by the way in which the fiber optic probe is held in its position about 30 mm from the specimen surface. If the lens-containing end of the probe is held fixed in a mount and the fiber end is free, the fiber moves to the point of best light concentration. Conversely, if the fiber end is held fixed in a mount and the lens end is free, the flex-adjusting screws 5 allow the point of best light concentration to be moved laterally to coincide with the end of the reflected-light fiber. Note that mounting the probe in such a way as to restrict the motion of both of its ends at once is not allowed, since such a mounting would preclude operation of the flexing alignment feature of the probe's design.

The alignment of the concentrated reflected light onto the end of the reflected-light fiber is aided by fabricating one or more large holes in the side of the frame 1, so that the reflected-light fiber end can be seen by the operator performing the alignment. One such hole 23 is shown in FIG. 4.

Once the alignment of the optics is completed during manufacture of the fiber optic probe, no further alignment is normally required during set-up for the experiment. When the probe is installed approximately 30 mm from the specimen surface, the pre-aligned optical arrangement focuses light onto the specimen surface and collects the desired reflected light.

The depth-of-field and light-gathering performance of the probe is enhanced by the choice of a relatively small core diameter for the specimen-illuminating fiber (50 $\mu$m), which allows the incoming light to the specimen to be concentrated to a relatively small spot of about 500 $\mu$m. The lenses 10 and 11, in turn, image the 500 $\mu$m spot to an even smaller spot, about 300 $\mu$m, at the end of the reflected-light fiber. The reflected-light fiber diameter of 1000 $\mu$m provides a surface area at the fiber end which is about 10 times greater than the area of the spot of reflected light. This allows considerable motion of the specimen surface before the light at the end of the reflected-light fiber is so out-of-focus that an appreciable amount of reflected light is lost. Also, since the spot of light on the specimen surface (the "object") is more than 30 mm from the compound lens formed by lenses 10 and 11, and since the image of that spot is only about 18 mm from the compound lens, the image distance moves only about 60% as far as the object distance (i.e., the specimen surface). The reduced motion of the image at the reflected-light fiber end further enhances the depth of field.

It should be noted from FIGS. 4 and 5 that lenses 8 and 9 are plano-convex lenses, and that they are situated in the frame 1 with their curved surfaces facing each other. Such use of multiple lenses rather than one lens to achieve a given large bend in the light path, wherein the bending is distributed more or less evenly among the lens surfaces by having the curved surfaces adjacent, is good optical practice which minimizes distortions due to the spherical lens surfaces. The use of two lenses rather than only one, as in previous fiber optic probes, and their arrangement according to good optical practice further enhances the light-gathering efficiency and the depth of field of the present invention.

Another advantage of the use of two lenses as shown in FIGS. 4 and 5 relates to the very high concentration of laser light in the 50 $\mu m$ core of the specimen-illuminating fiber. The light power density can be high enough to vaporize any organic dust particles, such as pollen, etc., which might stray into the intense light at the fiber's end. The smoke released by such a particle can coat the end of the fiber, thus darkening the fiber end and absorbing more laser light. The energy deposition at the fiber's end then produces thermal gradients in the glass of the fiber which can cause the glass to fracture, further degrading the light transmission, and thus ruining the fiber optic probe. In the preferred embodiment described here, the fiber end 14 is located in an isolated compartment bounded by the first plastic lens 10 with its central hole 15 plugged by the GRIN lens 12, the second plastic lens with its central hole 13 plugged by the specimen-illuminating fiber 8, and the inside diameter 18 of the lens end of the probe. Because the small, isolated volume around the fiber end 14 is essentially dust-free, the reliability of the probe is improved compared to previous designs.

It will be clear to those skilled in optics that, for given focal lengths of lenses 8 and 9, the farther the aligned distance from the probe to the specimen surface, the larger the depth of field will be. However, as the distance from the probe to the specimen surface is increased, the reflected light collected by the probe will decrease due to inverse square attenuation. The choice of 30 mm in the preferred embodiment shown here represents a particular compromise between light-gathering efficiency and depth of field which has been found useful in certain experiments. Other experiments may require quite different choices of distance to the specimen surface. Likewise, there are penalties associated with using too large a fiber diameter for the reflected-light fiber. The main penalty has to do with the fact that the minimum collimated diameter of a light beam and the maximum distance over which the beam remains collimated depend of the size of the light source: The larger the source, the larger the minimum collimated beam diameter and/or the shorter the distance over which the beam remains collimated. The light from the instrumentation end of the reflected-light fiber must be collimated, ideally to a small pencil of light, for transmission through the optics of an interferometer, and the source size of the light which must be collimated is the diameter of the reflected-light fiber. Therefore, although the very large reflected-light fiber diameter of 1000 $\mu m$ described in the preferred embodiment has been an advantage when using certain interferometers with short light path lengths to decode the light's Doppler shift, smaller reflected-light fiber diameters are sometimes required for use with interferometers having longer path lengths.

While a preferred embodiment of the present invention has been shown and described herein, it will be obvious that this embodiment is provided by way of example only. Numerous variations, changes, and substitutions will occur to those skilled in the art without departing from the invention herein. Accordingly, it is intended that the invention be limited only by the spirit and scope of the appended claims.

What is claimed is:

1. A fiber optic probe for the instrumentation of high-pressure shock experiments, comprising
   a frame to which and in which optical fibers and optical elements are attached, with adjustable flexure for the purpose of alignment of said optical fibers and said optical elements;
   a specimen-illuminating optical fiber for the transmission of light from a laser, the end of said fiber being held at an optimal position in said frame;
   a reflected-light optical fiber for the transmission of laser light, which has been reflected from a specimen surface whose velocity is to be measured, to light diagnostics instrumentation, the end of said reflected-light fiber being held in said frame at a point of concentration of the reflected light from said specimen surface;
   one or more optical elements so disposed on or within said frame as to concentrate the light emanating from said specimen-illuminating fiber onto said specimen surface, and to concentrate light reflected from said specimen surface onto the end of said reflected-light optical fiber; and means for attaching or fixing said optical fibers and said optical elements to their assigned locations in or on said frame.

2. The fiber optic probe of claim 1 wherein said frame comprises a region of enhanced flexibility situated between the ends of said frame, and wherein the degree of flexing in various directions is controlled by screw adjustments.

3. The fiber optic probe of claim 2 wherein said frame is tubular over part of its length, and wherein said region of enhanced flexibility is achieved by fabricating several transverse slits, within a close longitudinal proximity to each other but dispersed laterally, cutting through the walls of said tubular portion of said frame.

4. The fiber optic probe of claim 3 wherein said slits comprise (1) two first slits cutting into opposite sides of said tubular portion of said frame, leaving only two hinge stations of uncut material connecting the parts of said frame on either side of said first slits; and (2) two second slits longitudinally located close to but not overlapping said first slits, also cutting into opposite sides of said tubular portion of said frame, and also leaving only two additional hinge stations of uncut material connecting the parts of said frame on either side of said second slits, the orientation of said second slits being chosen such that the hinge stations resulting from said second slits are located at approximately 90 degree intervals from the hinge stations resulting from said first slits.

5. The fiber optic probe of claim 2 wherein said screw adjustments comprise two screws, positioned so that the flexing controlled by one of said screws is in a direction perpendicular to the direction of flexing controlled by the other said screw, thus providing orthogonal flexure controls which are mutually independent.

6. The fiber optic probe of claim 2 wherein said screw adjustments comprise captive screws spanning said region of enhanced flexibility, with screw heads which are constrained such that turning any one of said screws can produce either a push or a pull in the longitudinal direction of said screw, depending on the direction of rotation of said screw.

7. The fiber optic probe of claim 1 wherein the diameter of said reflected-light fiber is at least eight times larger than the diameter of said specimen-illuminating fiber, thus enhancing the light-gathering and depth-of-field capabilities of said probe.

8. The fiber optic probe of claim 1 wherein said optical elements comprise a graded index (GRIN) lens and a first plastic lens with a central hole, wherein said GRIN lens is fixed, said GRIN lens serving to capture laser light from said specimen-illuminating optical fiber and to concentrate said light onto said specimen surface, and said first plastic lens serving to capture reflected light from said specimen surface, and to concentrate said reflected light onto the end of said reflected-light optical fiber.

9. The fiber optic probe of claim 8 additionally comprising a second plastic lens with a central hole, wherein the end of said specimen-illuminating optical fiber is held in such position that its light is captured by said GRIN lens and concentrated on said specimen surface, with said first plastic lens and said second plastic lens serving together as a compound lens to capture reflected light from said specimen surface, and to concentrate said reflected light onto the end of said reflected-light optical fiber.

10. The fiber optic probe of claim 9 wherein said plastic lenses are plano-convex lenses, having their curved surfaces facing each other in the probe.

11. The fiber optic probe of claim 9 wherein said first plastic lens is situated in a region of said frame which allows some variability of said first plastic lens's position, both laterally and longitudinally, thus allowing the alignment of said GRIN lens with respect to the end of said specimen-illuminating fiber.

12. The fiber optic probe of claim 11 wherein set screws are used to hold said first plastic lens in such position that said GRIN lens is optimally aligned with respect to the end of said specimen-illuminating fiber.

13. The fiber optic probe of claim 9 wherein the end of said specimen-illuminating fiber is located in an essentially dust-free volume bounded in part by said first plastic lens, said second plastic lens, and a tubular portion of said frame.

14. The fiber optic probe of claim 3, additionally comprising one or more holes in said tubular part of said frame, of such position, size, and shape as to allow an operator to observe the end of said reflected-light fiber while aligning said reflected-light fiber to be held at the point of concentration of said reflected light from said specimen surface.

* * * * *